United States Patent [19]

Suzuki

[11] Patent Number: 4,691,309
[45] Date of Patent: Sep. 1, 1987

[54] MAGAZINE FOR DISCS IN HOLDERS, AND COMBINATION OF A DISC-PLAYER WITH SUCH A MAGAZINE

[75] Inventor: Yukio Suzuki, Kanagawa, Japan

[73] Assignee: U.S. Philips Corporation, New York, N.Y.

[21] Appl. No.: 753,199

[22] Filed: Jul. 9, 1985

[30] Foreign Application Priority Data

Jul. 11, 1984 [JP] Japan ............................ 59-103688[U]
Jul. 14, 1984 [JP] Japan ............................ 59-105825[U]
Jul. 20, 1984 [JP] Japan ............................ 59-108998[U]

[51] Int. Cl.⁴ .......................... G11B 17/00; G11B 5/48
[52] U.S. Cl. ........................................ 369/38; 369/194
[58] Field of Search .................... 369/36, 37, 38, 39, 369/194

[56] References Cited

U.S. PATENT DOCUMENTS

| | | | |
|---|---|---|---|
| 2,891,797 | 6/1959 | Hall et al. ............................ | 369/38 |
| 3,997,256 | 12/1976 | Wells ................................. | 353/27 A |
| 4,170,030 | 10/1979 | Castrodale et al. .................... | 369/38 |
| 4,479,210 | 10/1984 | Nakayama ............................. | 369/194 |
| 4,527,262 | 7/1985 | Manto .................................. | 369/39 |
| 4,561,078 | 12/1985 | Nakayama ............................. | 369/36 |
| 4,567,584 | 1/1986 | Kawakami ............................. | 369/38 |

Primary Examiner—Steven L. Stephan
Attorney, Agent, or Firm—F. Brice Faller

[57] ABSTRACT

A magazine (1) for a plurality of disc-shaped information carriers (50) contained in holders (7) situated one above the other, comprising an opening (8,9) near at least one upright side for the insertion and removal of the holders (7). A pivotable latching lever (12;55) is arranged near one of the side walls (3), which lever comprises two arms, of which one arm carries a latching element (13, 14; 56, 57) near said opening and the other arm can be actuated from the exterior of the magazine to pivot the latching lever (12; 55) from a first position to a second position against the force of spring means (16), in which second position the holders (7) of the latching element (13, 14; 56, 57) are released, so that the holders (7) can be slid through the opening (8, 9).

14 Claims, 11 Drawing Figures

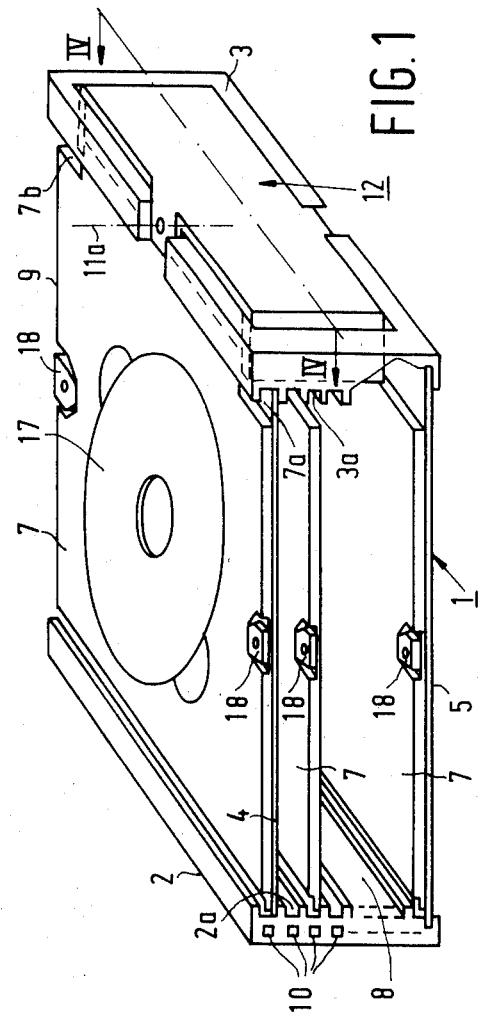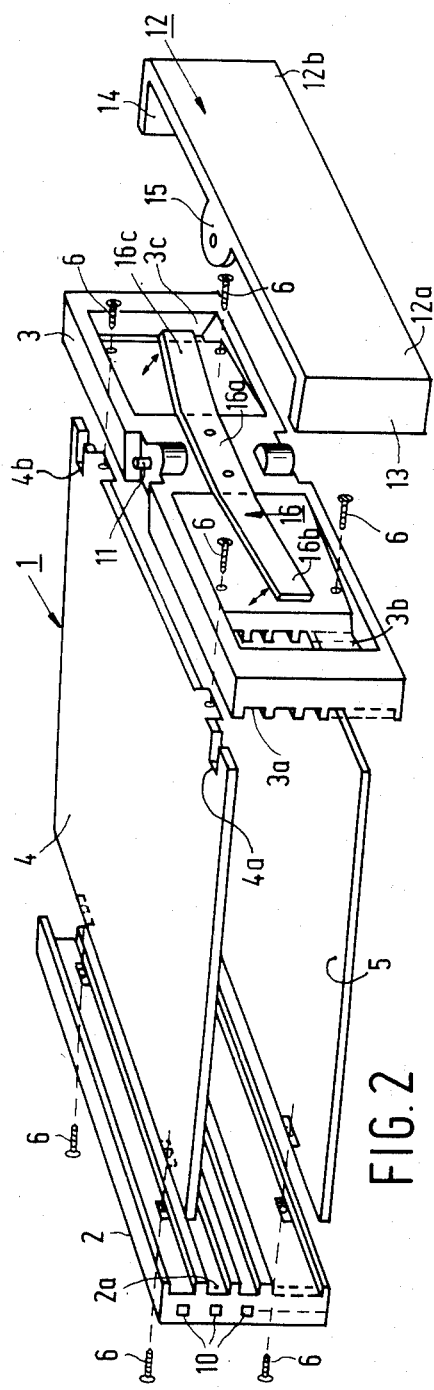

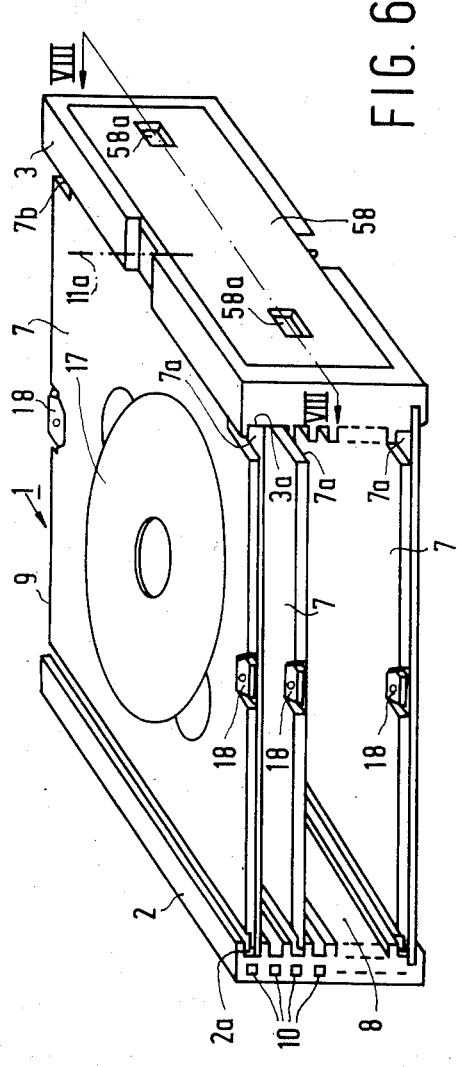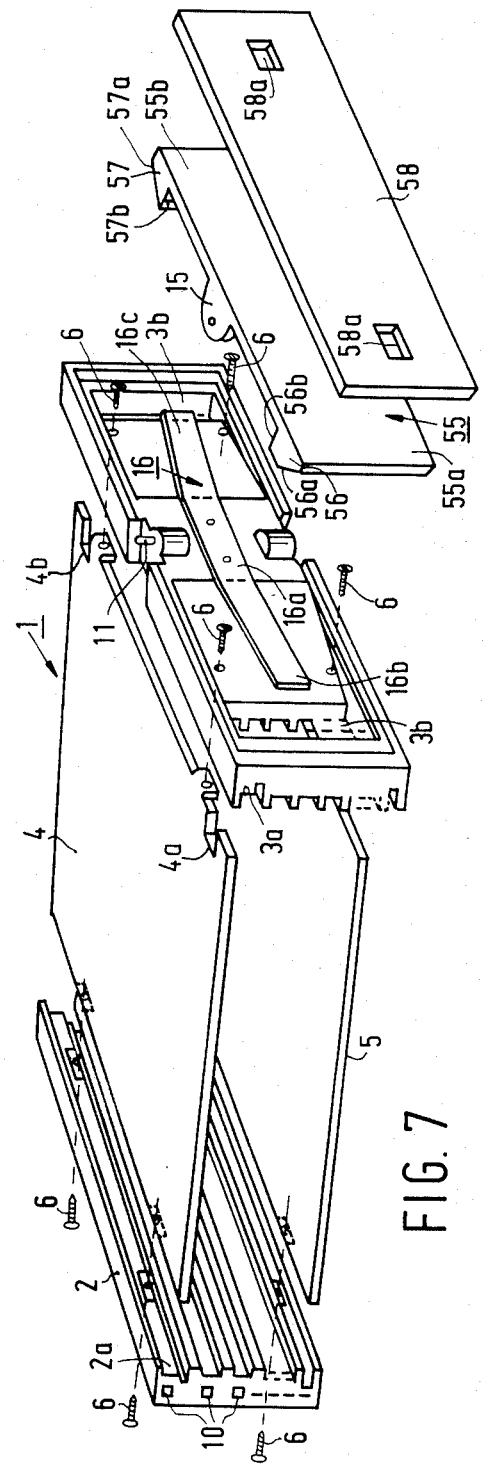

MAGAZINE FOR DISCS IN HOLDERS, AND COMBINATION OF A DISC-PLAYER WITH SUCH A MAGAZINE

BACKGROUND OF THE INVENTION

The invention relates to a magazine for a plurality of disc-shaped information carriers accommodated in holders which are arranged above one another. The magazine comprises mutually parallel major walls near the top and bottom and side walls near two opposite sides, which side walls carry guide means for positioning the respective holders above one another. At least one further upright side has an opening for sliding the holders into and out of the magazine in a direction parallel to the major walls.

Such a magazine is disclosed in EP-A-No. 0109711 to which U.S. Pat. No. 4,479,210 corresponds. This magazine cannot only be used as a means for the storage of disc-shaped information carriers, but it can also be used in conjunction with an apparatus for recording and/or reading information on/from the information carriers. An example of this is the use of a disc changer in which the respective holders are consecutively slid through an opening in the upright side. The holders cannot be latched in this known magazine. Consequently, if the magazine is subjected to shocks or if it is in an oblique position, the holders may slip out of the magazine through the opening, which is undesirable because this may lead to the information carriers being damaged.

SUMMARY OF THE INVENTION

It is an object of the invention to provide a magazine with an effective, compact and easy-to-operate latching means for the holders.

To this end the magazine comprises a latching lever which is situated near one of the side walls, which is pivotable about a pivotal axis which extends substantially perpendicularly to the major walls and which comprises two arms, which are each situated on the opposite sides of the pivotal axis, one arm carrying a latching element near said opening. The latching lever is urged into a first position by spring means, in which position the latching element latches the holders in the magazine. By pivoting the latching lever against the force of the spring means from the first position to a second position, the holders are released by the latching element and can be slid through the opening.

This results in a magazine in which the holders can be latched in a reliable manner, whilst all the holders contained in the magazine can be unlatched simultaneously by means of the relevant arm. Arranging the latching means near one of the side walls has the advantage that the latching lever occupies only a minimal space in the magazine. These advantages render the magazine in accordance with the invention not only suitable for use as a storage magazine but also a changer magazine for a disc changer, in which the central latching and unlatching facilitate the insertion into and the removal of the magazine from the changer.

U.S. Pat. No. 1,433,103 describes a magazine for a disc changer, in which magazine the holders are latched by a latching rod which extends over the entire height of the mazagine. The latching rod has one notch, enabling one holder to be released at a time by a relative movement of the magazine with respect to the latching rod. The magazine and the latching rod are integrated in the disc changer. Therefore, the magazine is not suitable for being replaced by another magazine or for use as a disc-storage means.

A preferred embodiment of a magazine in accodance with the invention is characterized in that on two opposite upright sides the magazine has an opening for the holders, and near a first and a second opening the respective arms carry a first and a second latching element respectively, which arms can each be actuated externally of the magazine to pivot the latching lever against the force of the spring means from the first position to the second or a third position, in which second and third position the holders can be slid through the first and the second opening respectively, whilst in the second position and in the third position of the latching lever the second and the first latching element near the second and the first opening, respectively are situated in a stop position in which they block the relevant opening for the passage of the holders.

This enables the holders to be slid into or out of the magazine from two sides. In this way the magazine is more convenient to use. An additional advantage is that the opening opposite the opening through which the holder is slid in or out is closed by the relevant latching element. Thus, the latching element performs two functions, namely latching the holders and limiting the insertion movement of the holder. It is to be noted that both latching elements are operative in the first position of the latching lever, so that each holder is latched between the two latching elements. In this way the holders are retained effectively inside the magazine.

Viewed parallel to the pivotal axis the latching lever may be substantially U-shaped, the latching elements constituting the limbs of the U and the two arms together constituting the portion connecting the limbs of the U, the pivotal axis being spaced equidistantly from the limbs at the location where the arms adjoin each other.

Thus, the latching lever is pivotable about the pivotal axis like a see-saw. And latching is effected in the same way at both openings of the magazine. Further, the latching lever construction is simple and compact, so that it can readily be accommodated in the magazine.

The latching lever may be constructed as an upright wall which extends over substantially the entire height of the magazine to be actuated easily and simply. Moreover, all the holders, which are situated above one another, can thus be latched or unlatched easily by means of the latching lever.

Each latching element may be formed by a latching projection on the main portion, which latching projection comprises a sliding wall, inclined relative to the main portion at the side facing the adjacent opening viewed in a direction parallel to the pivotal axis, and an adjoining latching wall which extends perpendicularly to the main portion.

The advantage of such an inclined sliding wall is that the latching lever need not be pivoted before insertion of the respective holders. This pivotal movement can be obtained in that the relevant holder slides along the sliding wall of the relevant latching element. After having passed the sliding wall the holder is latched effectively behind the latching wall.

The invention also relates to a combination of a disc player with a magazine, which player comprises a transfer means which positions the magazine relative to a loading device, which slides the respective holders into and out of the magazine. Such a combination is described in U.S. Pat. No. 4,479,219, in which the player comprises an actuating member against which one of the arms of the latching lever is urged when the magazine is placed on the supporting member, as a result of which the latching lever is pivoted out of the first position, thereby latching the holders. On account of the presence of the actuating member on the player the latching lever is pivoted from the first to the second or the third position and the holders are released at the same time that the magazine is positioned on the transfer means of the player, which does not require any further operation. Moreover, this ensure that after removal of the magazine to holders in the magazine are automatically re-latched under the influence of the spring means. Such a combination may comprise, for example, a player intended for reading optical audio discs, generally referred to as a Compact-Disc player, in which the player cooperates with a disc-changing mechanism. Thus, the combination can function as a changer for Compact Discs.

In the drawings:

BRIEF DESCRIPTION OF THE DRAWING

FIG. 1 is a perspective view of a magazine, containing a number of holders;

FIG. 2 is an exploded view of the magazine as shown in FIG. 1.

FIG. 6 is a perspective view showing a magazine in accordance with a second embodiment;

FIG. 7 is an exploded view of the magazine shown in FIG. 6;

DETAILED DESCRIPTION OF THE PREFERRED EMBODIMENTS

Figure 3:
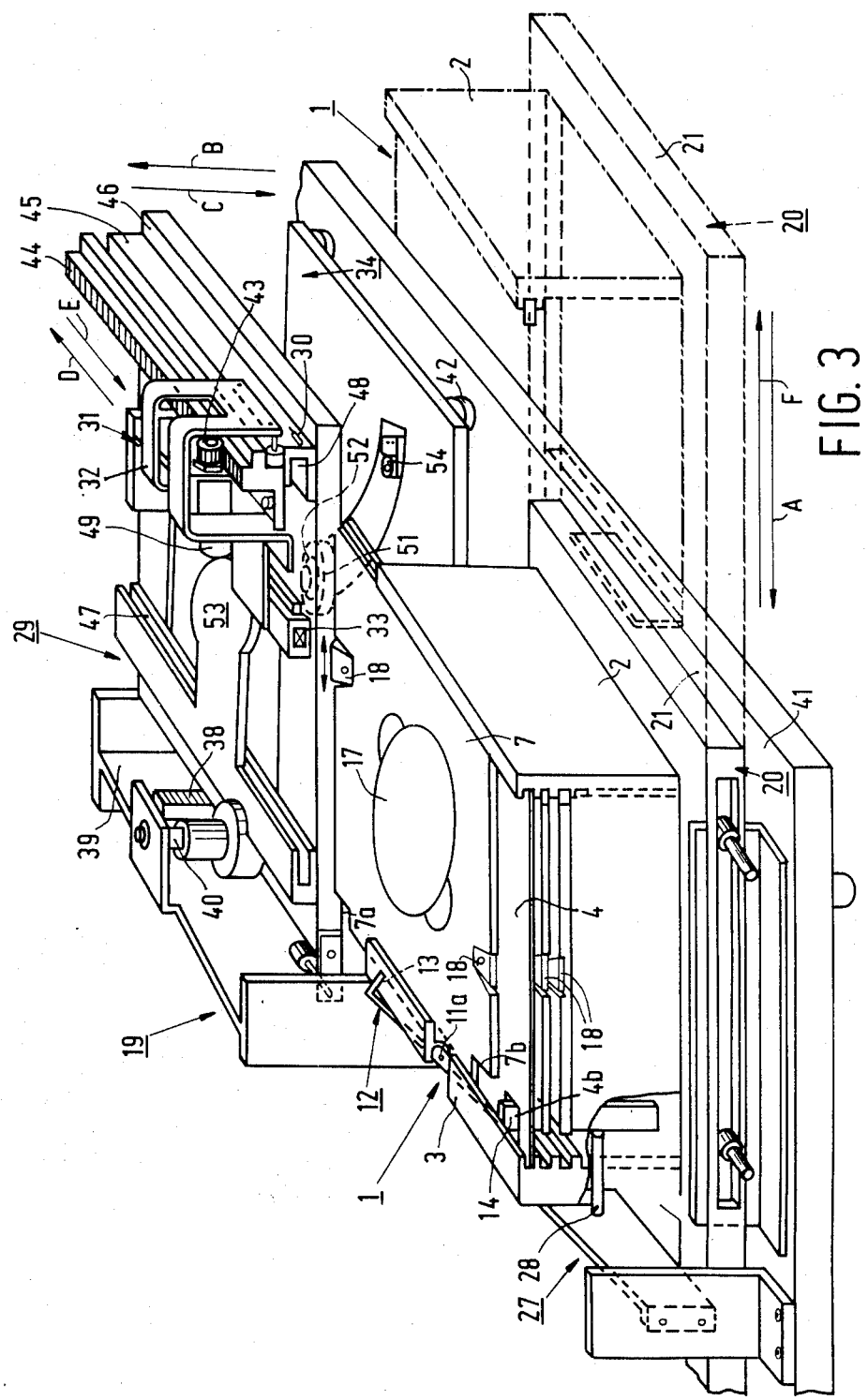
FIG. 3 is a perspective view showing the magazine of FIG. 1 in combination with a disc changer.

A magazine 1 shown in FIGS. 1 and 2 comprises upright side walls 2 and 3, which are interconnected by two parallel major walls, namely an upper wall 4 and a lower wall 5, which are secured to the side walls by means of screws 6. The facing sides of the side walls 2 and 3 carry guide means comprising rebates 2a and 3a respectively, which serve for guiding holders 7 and positioning them above one another. The shape of the rebates 2a differs from the shape of the rebates 3a, these shapes being keyed to the shapes of the relevant edges of the holders 7, so as to prevent the holder 7 from being inserted into the magazine 1 in an inverted position. The magazine 1 further has openings 8 and 9 through which the holders 7 can be slid into and out of the magazine. Detection elements 10 are arranged on the end of the side wall 2 adjacent the opening 8. Each detection element corresponds to a specific position of a holder 7, which position is defined by a pair of rebates 2a, 3a. The upper wall 4 is supported by the bottom walls of the uppermost pair of rebates 2a, 3a, so that the uppermost holder 7 is also accessible from the top of the magazine (see FIG. 1).

Figure 4A:
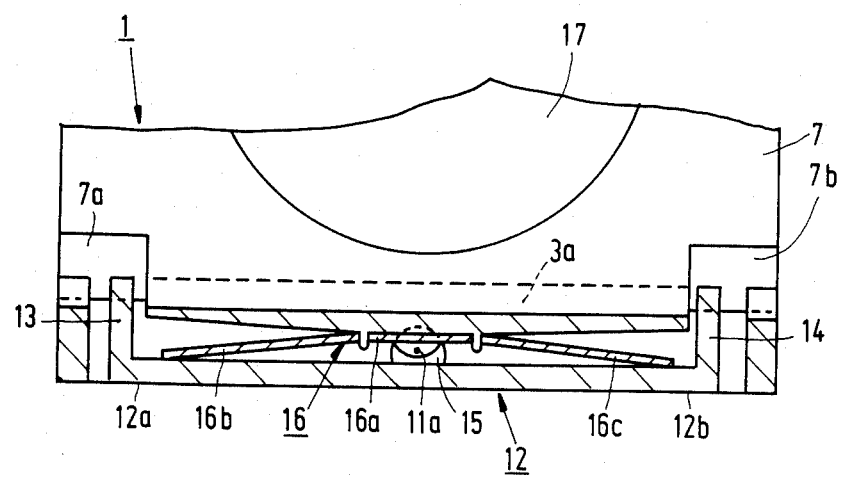
FIG. 4a is a sectional view of a part of the magazine, taken on the line IV—IV in FIG. 1.

The side wall 3 carries pivot 11 about a which a U-shaped two-arm latching lever 12 is pivotable, the pivotal axis 11a being oriented substantially perpendicularly to the major walls 4 and 5. The two arms 12a and 12b of the lever 12 are each situated on opposite sides of the pivotal axis 11a. The latching lever 12 is constructed as an imperforate upright wall which extends over substantially the entire height of the magazine 1, which extends substantially parallel to the side wall 3 in a first position as is shown in FIG. 4a, and which comprises end portions 13 and 14 which extend perpendicularly relative to the arms 12a and 12b, respectively. These end portions are situated near the openings 8 and 9 and they extend through openings 3b and 3c formed in the side wall 3. The upper wall 4 has recesses 4a, 4b to allow the free pivotal movement of the end portions 13 and 14, respectively. As can be seen in FIG. 4a, the pivotal axis 11a is situated equidistantly between the end portions 13 and 14. The latching lever 12 is mounted on the pivots 11 by means of ears 15. The side of the side wall 3 adjacent the latching lever 12 carries spring means, comprising an elongate blade 16 comprising a central portion 16a connected to the side wall 3 and end portions 16b and 16c, which press against the inner side of the latching lever in the first position of the latching lever as shown in FIG. 4a and thereby retain it in this position. It is to be noted that it is advantageous to construct the side wall 3 in such a way that the combination of the blade spring 16 and the latching lever 12 is situated in a reentrant portion of the side wall, so that the outer surface of the latching lever 12 constitutes an upright outer wall of the magazine.

Figure 4B:
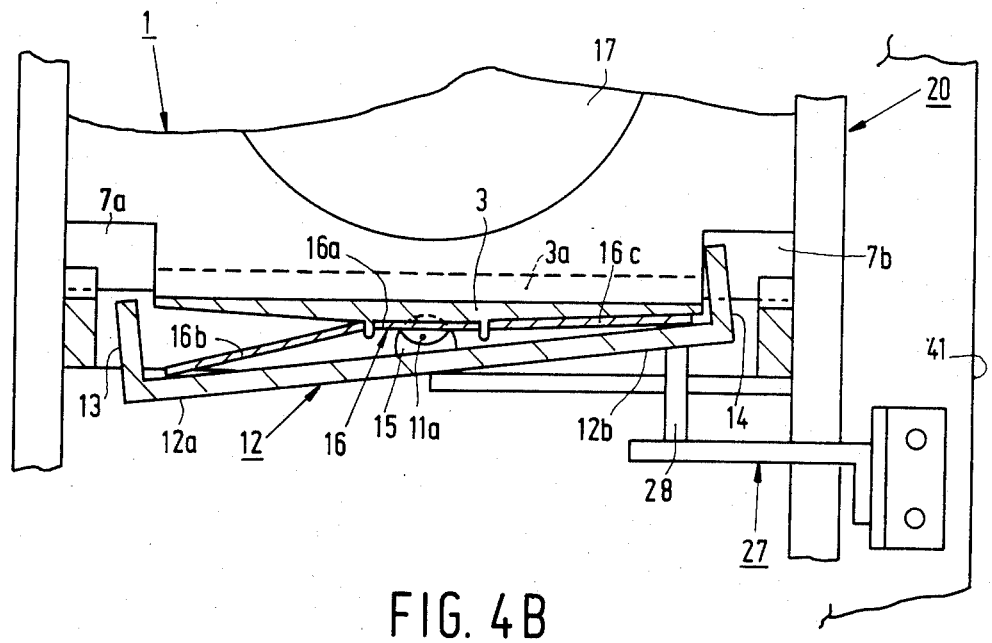
FIG. 4b is a sectional view which is similar to that in FIG. 4a but in which the latching lever is pivoted after the magazine has been placed into the changer.

At the corners the sides facing the side wall 3 each holder 7 have recesses 7a and 7b, which are bounded by mutually perpendicular wall portions in the plane view shown in FIG. 4a and which can receive the free ends of the end portions 13 and 14. In this way the end portions 13 and 14 can function as latching elements for the latching lever 12, in such a way that in the position shown in FIG. 4a the holder 7 is latched between the end portions 13 and 14 and can not be removed from the magazine 1. The holders 7 can be inserted after pressing against one of the arms 12a and 12b of the latching lever 12, for example with a finger, so that the latching lever is pivoted from the first latching position to a second or a third position. The relevant arm 12a or 12b can readily be actuated against the force of the blade spring 16 because the arms are located at the outside of the magazine. FIG. 4b shows such a pivoted position. In this position the holder 7 can be inserted through the opening 8 until the wall of the recess 7b abuts against end portion 14. It is important that in the position shown in FIG. 4b the end portion 14 blocks the opening 9. It will be evident that in the pivoted position it is essential that the end portion 13 lies outside the path of insertion of the holder 7 into the magazine 1. After release of the arm 12b of the latching lever 12 the blade spring 16 ensures that the latching lever automatically returns to the first position as shown in FIG. 4a. If a holder 7 is to be slid in or out through the opening 9, the arm 12a of the lever can be actuated with a finger, so that the latching lever 12 is pivoted clockwise from the position shown in FIG. 4a and subsequently the end portion 13 closes the opening 8 for the holder in a stop position.

This construction of the magazine 1 has the advantage that the holders 7 can be slid in or slid out both from the side of the opening 8 and from the side of the opening 9.

It is to be noted that alternatively, in a manner not shown, the magazine 1 may be provided with three upright imperforate walls, so that only the opening 8 is present and there is no opening 9. In such an embodiment the latching lever 12 may comprise only the end portion 13; the end portion 14 may be dispensed with, because the imperforate side wall limits the insertion movement of the holder 7. This alternative embodiment also has the advantage of a convenient actuation of the latching lever 12.

The magazine 1 is intended for receiving disc-shaped information carriers which are accommodated in holders 7 and which in the present example are optically readable discs 17 of a type generally referred to as Compact Discs. These discs are positioned in the holders 7 with the information-carrying sides facing downwards. The holders each comprise two iron elements 18, whose function will be described hereinafter.

Figure 5:
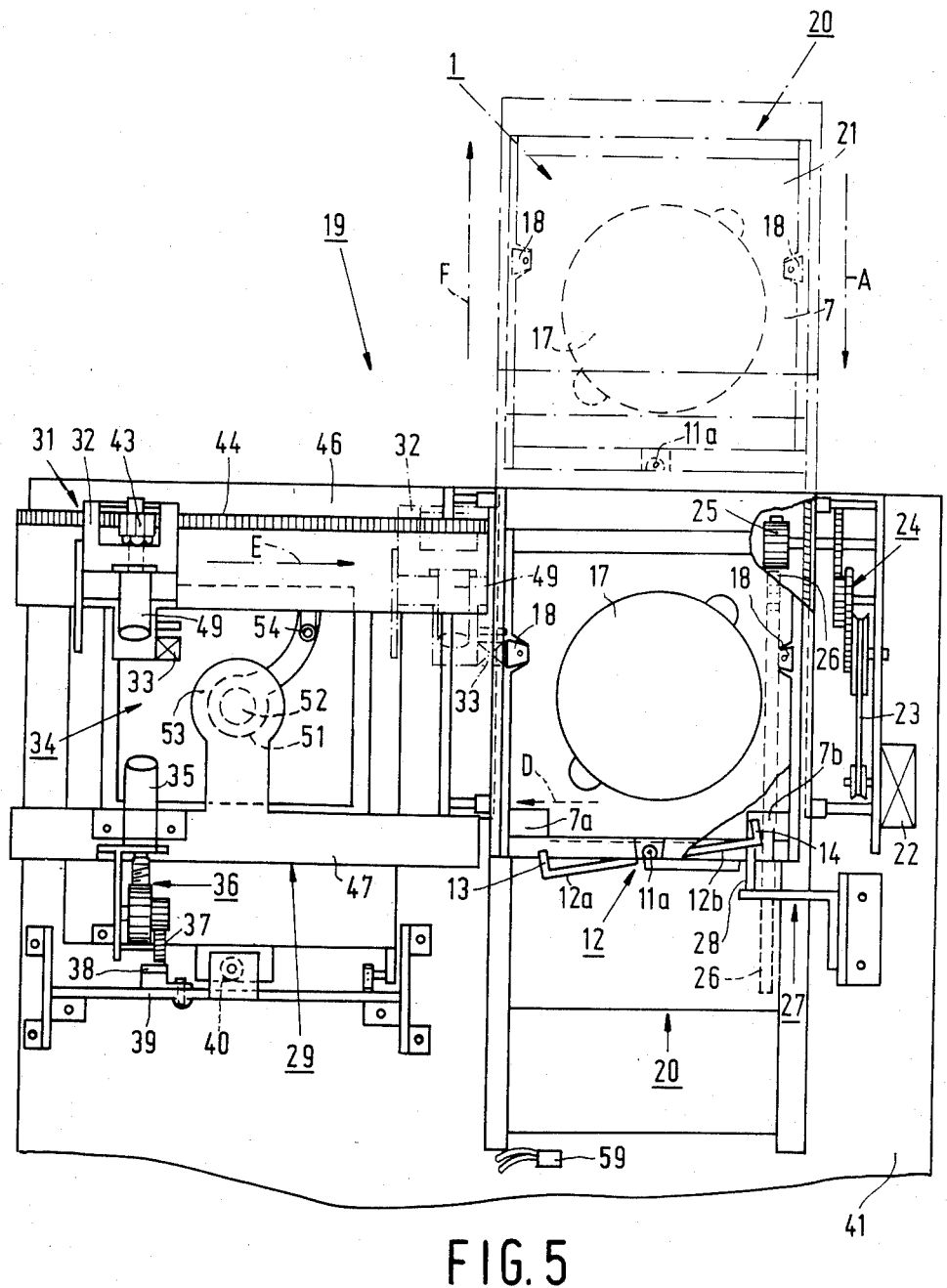
FIG. 5 is a plan view of the combination of a changer and a magazine as shown in FIG. 3.

The magazine 1 is not only intended for the storage of the relevant discs 17, but also serves as an exchangeable magazine for a disc changer 19 (see FIGS. 3 and 5). The charger 19 comprises a transfer device 20, provided with a supporting member 21. This supporting member can be slid out to project from the front panel, not shown, of the disc changer, so that the magazine 1 can easily be placed onto the supporting member 21. This extended position is shown in dash-dot lines in FIG. 3 and FIG. 5. Further, the transfer device 20 comprises a drive mechanism, which comprises a drive motor 22, a belt 23, and a gear transmission 24, which drives a gear wheel 25. This gear wheel meshes with a gear rack 26 on the underside of the supporting member 21 (FIG. 5). Thus, when the gear wheel 25 is driven the supporting member 21 with the magazine 1 can be moved through the opening in the front panel, not shown, in the direction indicated by the arrow A into the position shown in solid lines in FIGS. 3 and 5. In this position, the motor 22 is switched off.

The changer 19 comprises an actuating member 27, which comprises an actuating rod 28 against which the latching lever 12 abuts during the inward movement of the magazine 1. As a result of this, the latching lever is pivoted from the first position to the position shown in FIGS. 3, 4b and 5. As a result of the pivotal movement of the latching lever 12 the end portion 13 has moved out of the recess 7a in the holder 7 and in this pivoted position the end portion 14 blocks the opening 9 for the holders. In this way the central latching lever 12 allows the passage of all the holders 7 through the opening 8.

The changer 19 further comprises a lifting device 29 provided with a sensor 30 which scans the detection elements 10 to stop the upward or downward movement of the lifting device 29, as indicated by the arrows B and C, respectively in FIG. 3, at such a level that the selected holder 7 in the magazine 1 can be transferred from the magazine 1 by a loading device 31 comprising a carriage 32 which is provided with an electromagnet 33, which is mounted on that side of the carriage 32 which faces the magazine 1. By positioning the magazine 1 on the supporting member 21 it is ensured that after the movement of the lifting device 29 to the selected level the iron element 18 is positioned correctly relative to the electromagnet 33 to be coupled to this magnet when it is energized. Thus, during a horizontal movement in the direction indicated by the arrow D the carriage 32 can slide the relevant holder 7 out of the magazine until it is situated above a playing device 34 of the changer 19.

As is shown in FIG. 5, the lifting device 29 comprises an electric motor 35, which drives a gear transmission 36, which in its turn drives a gear wheel 37 which meshes with a gear rack 38 on a stationary wall 39 of the disc changer (see also FIG. 3). Thus, by means of the electric motor 35 the lifting device 39 can be raised and lowered as indicated by the arrows B and C, respectively. The lifting device is guided along a fixedly arranged guide rod 40 which together with the wall 39 is mounted on a deck plate 41, which further carries the playing device 34 on elastic buffers 42 and which also supports the transfer device 20 with its drive mechanism. The deck plate 41 also carries the actuating member 27. As the sensor 30 controls the electric motor 35 by an electronic circuit, not shown, during scanning of the respective detection elements 10 the lifting device 29 can thus be positioned at the desired level after an upward or downward movement. The carriage 32 is connected to a gear wheel 43, which is in mesh with a gear rack 43 on the upper side of a guide rail 34, which rail is mounted on a supporting plate 46 of the lifting device 29. This supporting plate further carries two mutually parallel rails 47 and 48, which are U-shaped and which guide the lateral edges of the holder 7. Thus, after energization of the electromagnet 33, the holder 7 can be transported horizontally by the loading device 31, which is driven by an electric motor 49. After the holder 7 has reached a position straight above the playing device 34, the lifting device 29 can be lowered as indicated by the arrow C, causing a disc 17 in the relevant holder to be loaded onto a turntable 51 of the playing device 34. A centring cone 52 above the turntable ensures the correct centring of the disc. A disc-pressure member 53 on the mounting plate 46 urges the disc against the upper side of the turntable 51. The positioning of the various parts relative to each other and in particular the positioning of the rails 47 and 48 relative to the disc-pressure member 53 is such that after the disc 17 has been deposited and pressed onto the turntable 51 the holder 7 is moved to a position below the upper side of the turntable by the lifting device 29, so that the disc comes clear of the holder. Thus, the disc can rotate freely on the turntable. Playing of the disc may now commence. For this purpose the playing device 34 comprises an optical scanning head 54.

After the playing operation has ended and the movements of the lifting device 29 and the loading device 31 described above are performed in reverse order. The lifting device 29 is then moved upwards as indicated by the arrow B in FIG. 3, so that the holder 7 lifts the disc 17. After the lifting device 29 has again reached the predetermined level, the loading device 31 with the carriage 32 moves back in the direction indicated by the arrow E, so that the relevant holder is slid into the magazine 2 at the correct location. In this respect it is advantageous that the latching lever 12 occupies the position shown in FIG. 4b, so that the holder cannot be inserted too far and occupies the correct position in the magazine 1 at the end of the movement of the loading device. If the magazine is to be removed from the disc changer, the transfer device 20 moves the supporting member 21 outwards as indicated by the arrow F, after which the magazine may be removed and replaced by another magazine. This has the advantage that during the outward movement in the direction indicated by the arrow F the latching lever 12 is set to the latching position shown in FIG. 4a under the influence of the blade spring 16, so that all the holders 7 in the magazine 1 are latched automatically. This ensures that when the magazine is removed from the disc changer no holders can fall out of the magazine with consequent damage to the discs. Thus, shocks which may occur during the outward movement of the supporting member and which are transmitted to the magazine 1 can have no adverse effect.

As is shown in plan view in FIG. 5, the loading device 31, the lifting device 29 and the playing device 34 in the present embodiment are situated to the left of the transfer device 20. However, in a manner not shown, it is alternatively possible to arrange a lifting device 29, a loading device 31 and a playing device 34, situated underneath the loading device, mirror-symmetrically on each side of the transfer device 20. This is possible because the magazine 1 has openings 8 and 9 on both sides and because the holders 7 are provided with iron elements 18 on both sides. Thus, in this double version one holder 7 can be transferred to the playing device 34 at the left of the transfer device 20 and the other holder 7 can be tranferred to the right of the transfer device 20 to be played by the playing device 34 at this location. It is evident that in this alternative embodiment the shape of the actuating member 27 is now also duplicated, the actuating pin 28, instead of being fixed, never being movable in a direction parallel to the arrow A, for example by means of an electromagnet. If a disc holder is not slid out to the left viewed in FIG. 5, the actuating pin should be in the position shown in FIG. 5, and if a holder 7 is slid out to the right, the actuating pin 28 is moved back and another actuating pin, not shown, which is situated at the left, brings the latching lever 12 in the other pivoted position. The main feature of this construction comprising two playing devices 34 is that the discs can be played without any interruption.

As is shown in FIGS. 6 and 7, the magazine has a slightly different shape in the second embodiment. Parts corresponding to those in the first embodiment bear the same reference numerals. In the present embodiment there is provided a latching lever 55 comprising a main portion which is similar to that of the lever 12 in the first embodiment and which comprises two arms 55a and 55b. However, near both ends the main portion comprises latching elements in the form of latching projections 56 and 57, which, viewed in a direction parallel to the pivotal axis 11a, comprise sliding walls 56a and 57a which are inclined relative to the main portion at the sides adjacent the openings 8 and 9, respectively. Adjoining the sliding wall each latching projection 56 and 57 comprises a latching wall 56b and 57b respectively, which extends perpendicularly to the main portion. As is shown in FIG. 8a the latching lever 55 is also U-shaped towards the inner side as a result of the presence of these latching portions. The latching projections 56 and 57 are preferably slightly rounded at the transitions between the sliding walls 56a and 57a and the latching walls 56b and 57b, respectively.

The latching lever 55 is arranged between the side wall 3 and an outer wall 58 of the magazine. For the actuation of the latching lever 55 two openings 58a are formed in the outer wall 58. Towards the end of the inward movement of the transfer device 20 the free end of the actuating pin 28 engages in one of the openings 58a, until eventually in the final position, after the switch 59 has switched off the motor 22, the latching lever 55 has reached the position shown in FIG. 8b. Thus, the latching lever 55 operates in the same way as the latching lever 12 of the magazine in accordance with the preceding embodiment. An advantage of the present embodiment may be that if the magazine has been removed from the disc changer, a holder 7 can be inserted without the latching lever 55 having to be pivoted. The holder can slide along the sliding wall 57a or 57b with its lateral edge and thereby slightly pivot the latching levers, which has the advantage that at the end of the insertion movement, when the latching projections 56 and 57 again have engaged the recesses 7a, 7b, the holder 7 is latched automatically inside the magazine 1.

Figure 9:
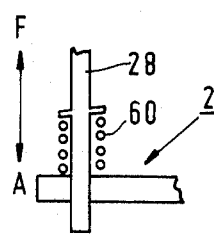
FIG. 9 shows a part of an actuating member of the changer.

The inclinend sliding walls 56a and 57a also enable holder 7 to be slid into a vacant compartment of the magazine 1. It is then advantageous if the actuating pin 28 is arranged in a manner as shown in FIG. 9, where the actuating pin 28 can be moved in the direction indicated by the arrow A against the pressure exerted by the spring 60. It is then important that the force exerted on the actuating pin 28 by the spring 60 is greater than the counter-pressure exerted on the actuating pin by the blade spring 16. By means of this construction it is possible to insert a holder 7 into the magazine from the right to the left in the plan view of FIG. 5 as indicated by the arrow D, whilst during the contact with the sliding wall 57a the latching lever 55 is temporarily pivoted back until the latching projection has engaged the recess 7b.

Figure 8:
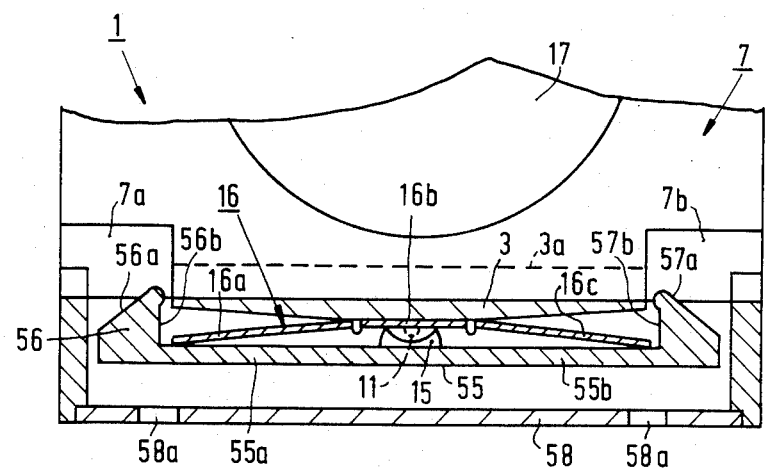
FIG. 8a is a sectional view of a part of the magazine, taken on the lines VIII—VIII in FIG. 6.
FIG. 8b is a sectional view similar to that in FIG. 8a, but in which the latching lever is pivoted after the magazine has been placed into the changer.
Figure 8B:
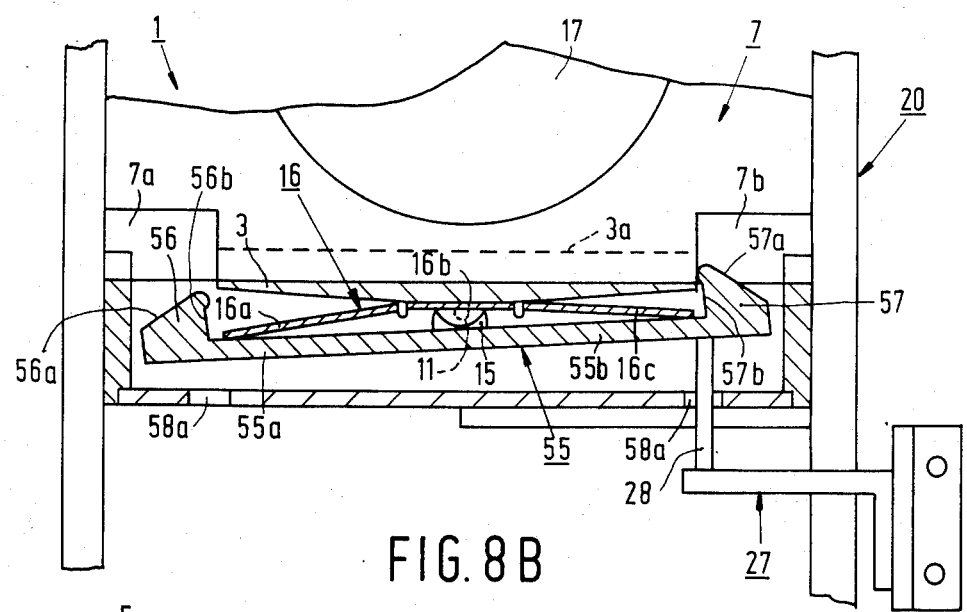

The magazine in the second embodiment shown in FIGS. 6 to 8 has the advantage that the latching lever is retained correctly and cannot be actuated inadvertently. Further, this magazine makes it possible to insert a holder without a separate actuation of the latching lever 55, as already stated.

The magazine in accordance with the invention is not only advantageous for use in conjunction with the disc changer shown but also has advantages when used as a storage magazine during the time that the magazine is not present in the disc changer. This is in particular so because all the holders are effectively latched in position after removal of the magazine from the changer.

It is to be noted that the disc changer described may also be used for other purposes. For example, the discs 50 may alternatively be discs on which signals are recorded and from which they are read. An example of this is a data recording apparatus for recording computer signals.

What is claimed is:

1. A magazine for a plurality of disc-shaped information carriers accommodated in holders which are arranged above one another, which magazine comprises mutually parallel major walls near the top and bottom and side walls near two opposite sides, which side walls carry guide means for positioning the respective holders above one another, the two further opposed upright sides having respective first and second openings for sliding the holders into and out of the magazine in a direction parallel to the major walls, characterized in that the magazine comprises a latching lever which is situated near one of the side walls, which is pivotable about a pivotal axis which extends substantially perpendicularly to the major walls and which comprises two arms, which are situated on the opposite sides of the pivotal axis, which arms carry respective first and second latching elements near respective first and second openings, which latching lever is urged into a first position by spring means in which position the latching elements latches the holders in the magazine, which arms can each be actuated externally of the magazine to pivot the latching lever against the force of the spring means from the first position to a second or a third position, in which second and third position the holders can be slid through the first and the second opening respectively, whilst in the second position and in the third position of the latching lever the second and the first latching element near the second and the first opening, respectively, are situated in a stop position in which they block the relevant opening for the passage of the holders.

2. A magazine as claimed in claim 1, characterized in that viewed parallel to the pivotal axis the latching lever is substantially U-shaped, the latching elements constituting the limbs of the U and the two arms together constituting the portion connecting the limbs of the U, the pivotal aix being spaced equidistantly from the limbs at the location where the arms adjoin each other.

3. A magazine as claimed in claim 2, characterized in that the latching lever is constructed as an upright wall which extends over substantially the entire height of the magazine.

4. A magazine as claimed in claim 3, characterized in that the latching elements comprise wall portions which are bent perpendicularly relative to the main portion.

5. A magazine as claimed in claim 3, characterized in that each latching element is formed by a latching projection on the main portion, which latching projection comprises a sliding wall, which is inclined relative to the main portion at the side facing the adjacent opening viewed in a direction parallel to the pivotal axis and an adjoining latching wall which extends perpendicularly to the main portion.

6. A magazine as claimed in any one of the claims 3 to 5, characterized in that the wall of the latching lever also constitutes an upright outer wall of the magazine.

7. A magazine as claimed in any one of the claims 3–6, characterized in that the latching lever is situated between the side wall and an outer wall of the magazine, which outer wall has an opening near each arm, via which opening the relevant arm can be actuated.

8. A magazine as claimed in claim 7, characterized in that the spring means are constructed as an elongate blade spring, having a central portion which is secured to the side wall adjacent the latching lever and having two free ends which press against the respective arms of the latching lever.

9. A magazine as claimed in claim 8, in which the holders are rectangular, characterized in that near at least one corner each holder has a recess which is engageable with the latching element for the purpose of latching.

10. A combination of a disc-player with a magazine as claimed in claim 9, which player comprises a supporting member which positions the magazine relative to a loading device which slides the respective holders into and out of the magazine, characterized in that the player comprises an actuating member against which one of the arms of the latching lever is urged when the magazine is placed on the supporting member, as a result of which the latching lever is pivoted out of the first position, thereby latching the holders.

11. A combination as claimed in claim 10, characterized in that the supporting member forms part of a transfer device which moves the magazine into and out of the player and the actuating member comprises an actuating rod against which one of the arms of the latching lever is pressed at the end of the inward movement of the transfer device.

12. A combination of a disc-player with a magzine as claimed in any one of claims 1–5, which layer comprises a supporting member which positions the magazine relative to a loading device which slides the respective holders into and out of the magazine, characterized in that the player comprises an actuating member against which one of the arms of the latching lever is urged when the magazine is placed on the supporting member, as a result of which the latching lever is pivoted out of the first position, thereby latching the holders.

13. A magazine as claimed in any one of claims 1–5, in which the holders are rectangular, characterized in that near at least one corner each holder has a recess which is engageable with the latching element for the purpose of latching.

14. A magazine as claimed in any one of claims 1–5, characterized in that the spring means are constructed as an elongate blade spring, having a central portion which is secured to the side wall adjacent the latching lever and having two free ends which press against the respective arms of the latching lever.

* * * * *